(12) United States Patent
Russette et al.

(10) Patent No.: US 9,671,836 B2
(45) Date of Patent: Jun. 6, 2017

(54) DATA STORAGE TRANSFER ARCHIVE REPOSITORY

(71) Applicant: BAE Systems Information and Electronic Systems Integration Inc., Nashua, NH (US)

(72) Inventors: Andrew R. Russette, Silver Spring, MD (US); Aaron Oberste, Severn, MD (US); Alexa D. Oberste, Severn, MA (US); Anthony P. Antoniades, Fulton, MD (US); Matthew F. Guenette, Baltimore, MD (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 78 days.

(21) Appl. No.: 14/425,397

(22) PCT Filed: Jul. 10, 2014

(86) PCT No.: PCT/US2014/046068
§ 371 (c)(1),
(2) Date: Mar. 3, 2015

(87) PCT Pub. No.: WO2015/006521
PCT Pub. Date: Jan. 15, 2015

(65) Prior Publication Data
US 2015/0227179 A1    Aug. 13, 2015

Related U.S. Application Data

(60) Provisional application No. 61/844,647, filed on Jul. 10, 2013, provisional application No. 61/950,555, filed on Mar. 10, 2014, provisional application No. 61/950,560, filed on Mar. 10, 2014, provisional application No. 61/950,565, filed on Mar. 10, 2014, provisional application No. 61/950,570, filed on Mar. 10, 2014, provisional application No. 61/967,150, filed on Mar. 10, 2014.

(51) Int. Cl.
*G06F 1/16* (2006.01)
*H05K 5/00* (2006.01)
(Continued)

(52) U.S. Cl.
CPC .............. *G06F 1/187* (2013.01); *G06F 1/181* (2013.01); *G11B 33/128* (2013.01);
(Continued)

(58) Field of Classification Search
CPC ................................. G06F 1/181; G06F 1/183
(Continued)

(56) References Cited

U.S. PATENT DOCUMENTS 5,227,957 A    7/1993    Deters
6,078,503 A    6/2000    Gallagher et al.
(Continued)

FOREIGN PATENT DOCUMENTS

WO    PCT/US14/46068    7/2014

*Primary Examiner* — Anthony Haughton
(74) *Attorney, Agent, or Firm* — Scott J. Asmus; Sand & Sebolt, LPA (57) ABSTRACT

A memory system includes c-shell units, PCBs, and a controller logic. The c-shell units are positioned side-by-side adjacent each other. Each c-shell unit has at least two sled-less memory bays and the sled-less memory bays are positioned vertically relative to each other. Each of the sled-less memory bays receives a memory device. A PCB is vertically mounted to a corresponding c-shell unit. The control logic controls access to and from the memory devices so that it manages storing data to the memory devices and retrieving data from the memory devices. Each PCB comprises traces to route signals between the control logic and the memory devices.

18 Claims, 9 Drawing Sheets

(51) Int. Cl.
   *H05K 7/00*   (2006.01)
   *G06F 1/18*   (2006.01)
   *G11B 33/12*  (2006.01)
   *G11B 33/14*  (2006.01)
   *G06F 3/06*   (2006.01)

(52) U.S. Cl.
   CPC .......... *G11B 33/142* (2013.01); *G06F 3/0658* (2013.01); *G06F 3/0689* (2013.01); *Y10T 29/49169* (2015.01)

(58) Field of Classification Search
   USPC .... 361/679.33–679.39, 724–727; 312/223.1, 312/223.2, 223.3
   See application file for complete search history.

(56) References Cited

U.S. PATENT DOCUMENTS

| | | | |
|---|---|---|---|
| 6,535,381 B2 | 3/2003 | Jahne et al. | |
| 7,187,547 B1 | 3/2007 | French et al. | |
| 7,394,660 B2 * | 7/2008 | Hidaka | G11B 33/126 361/724 |
| 7,414,835 B2 * | 8/2008 | Katakura | G11B 33/125 361/679.33 |
| 7,848,109 B2 | 12/2010 | Barringer et al. | |
| 8,081,441 B2 * | 12/2011 | Zhang | G11B 33/128 361/679.32 |
| 2003/0147220 A1 * | 8/2003 | Fairchild | G06F 1/184 361/726 |
| 2010/0172087 A1 * | 7/2010 | Jeffery | G11B 33/02 361/679.33 |
| 2011/0009047 A1 | 1/2011 | Noteboom et al. | |
| 2012/0026668 A1 | 2/2012 | Landon | |
| 2013/0050955 A1 * | 2/2013 | Shinsato | G06F 1/181 361/727 |
| 2013/0152376 A1 | 6/2013 | Corddry et al. | |
| 2013/0153200 A1 | 6/2013 | Rembach | |
| 2014/0029196 A1 | 1/2014 | Smith | |
| 2014/0055944 A1 | 2/2014 | McCabe et al. | |
| 2014/0203696 A1 * | 7/2014 | Rust | G11B 33/02 312/330.1 |
| 2014/0204525 A1 * | 7/2014 | Pecone | H05K 13/00 361/679.33 |

* cited by examiner

DATA STORAGE TRANSFER ARCHIVE REPOSITORY

BACKGROUND OF THE INVENTION

1. Field of Invention

The current invention relates generally to apparatus, systems and methods for electronically storing data. More particularly, the apparatus, systems and methods relate to storing data in memory bays. Specifically, the apparatus, systems and methods provide for storing data in memory bays that are accessed from the sides of a rack mountable chassis that only requires air cooling at a room temperature of about 70 degree Fahrenheit.

2. Description of Related Art

Current Commercial Off the Shelf (COTS) storage solutions are insufficient to meet the low Size Weight and Power (SWaP) requirements imposed by the growing data storage requirements in the commercial government and military sectors. Conventional Network Accessible Storage (NAS) systems and Storage Area Network (SAN) systems are designed for use in a large support infrastructure environment making them unsuitable for smaller support infrastructure scenarios such as those in government and military environments. Conventional NAS and SAN systems of a high data capacity (over 100 terabytes) are on average six rack units in height (10.5 inches) and have a weight of approximately eighty pounds. The cost of traditional NAS storage purchased from commercial vendors is high, the industry average being about one thousand dollars per terabyte. A need exists for a better digital data storage solution.

SUMMARY

One aspect of an embodiment of the invention includes a memory system. The memory system includes c-shell units, printed circuit boards (PCBs), and a controller logic. The c-shell units are positioned side-by-side adjacent each other. Each c-shell unit has at least two sled-less memory bays and the sled-less memory bays are positioned vertically relative to each other. Each of the sled-less memory bays receives a memory device. A PCB is vertically mounted to a corresponding c-shell unit. The control logic controls access to and from the memory devices so that it manages storing data to the memory devices and retrieving data from the memory devices. Each PCB comprises traces to route signals between the control logic and the memory devices.

In one aspect another embodiment may provide a TeraStar memory system. This memory system includes a housing that houses memory bays and memory devices. The housing has a front side, a back side, a left side, a right side, a bottom side and a top side. Two or more horizontal memory bays are horizontal and adjacent each other on the left side of the memory system. Memory devices are inserted into the horizontal memory bays on the left side. The memory devices can also be removed from horizontal memory bays on the left side. Two or more horizontal memory bays that are horizontal and adjacent each other are located on the right side of the memory system. Memory devices are inserted into the horizontal memory bays on the right side. The memory devices can also be removed from the horizontal memory bays on the right side.

Another aspect of the invention is a method of adding and removing memory from a memory system. The memory system is rack mountable with a front side, a back side, a left side, a right side, a top side and a bottom side with the memory system rack mountable between its left and right sides. The method begins by installing a first memory device into a first memory bay located on the left side of the memory system. The memory device and memory bay are similar to the memory devices and memory bays discussed below. A second memory device is installed into a second memory bay that is located on the left side of the memory system and where the second memory bay is horizontally adjacent the first memory bay. A third memory device is then removed from a third memory bay located on the left side of the memory system. The third memory bay is horizontally adjacent the first memory bay. A fourth memory device is installed into a fourth memory bay located on the right side of the memory system. A fifth memory device is removed from a fifth memory bay located on the right side of the memory system where the fifth memory bay is vertically adjacent the fourth memory bay.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

FIGS. 1-8 illustrate the preferred embodiment of a memory system 1 that can store at least 128 terabytes of data. This memory system 1 is also known as a Terabyte Storage Transfer Archive Repository (TeraStar). TeraStar (memory system 1) is a great improvement over prior art system. For example, this memory system 1 fits into a small three rack unit (RU) in height (5.25 inches) chassis that is capable of hosting 32 removable/hot swap drives of serial advanced technology attachment (SATA) (versions I, II, III), serial attached SCSI (SAS) (versions 3, 6) and/or other Solid State Disk (SSD) versions in either a 3.5 inch and/or a 2.5 inch form factor. The capacity of this system 1 is a direct result of the internal disk orientation which is a unique side accessible design as discussed below. The memory system 1 also provides for the addition of 2×3.5 inch non-removable drives and 2×2.5 inch non-removable drives. This novel memory system 1 provides flexibility to utilize either Redundant Array of Independent Disks (RAID) configurations or Just a Bunch of Disks (JBOD) configurations or both simultaneously. Currently the COTS industry average storage capacity for a 3 RU data storage solution has a maximum disk capacity of sixteen removable disks. As of Jul. 10, 2013, high end NAS/SAN COTS vendors have an average cost to the customer of $1000.00+ per terabyte (TB). In contrast, the TeraStar memory system 1 on average costs about $200.00 per TB as of Jul. 10, 2013. The TeraStar memory system 1 also uses a highly efficient power utilization model reducing the need for the average 1200 W power supply which is a standard minimum for NAS/SAN COTS systems of similar size or capacity.

Prior art memory systems chassis in general utilize cold rolled steel. This results in an average weight per three rack units (RU) chassis of 80 pounds (system board and core components installed) per chassis. By taking advantage of high strength (5000 series) aluminum in the design and manufacturing of the TeraStar memory system 1, the overall weight of the chassis is reduced to 28 pounds with the system board and core components installed. This makes for a much more consumer manageable system as well as increasing the overall capacity per server rack by reducing the total weight per rack to within standard defined manufacturer weight limits.

Figure 1:
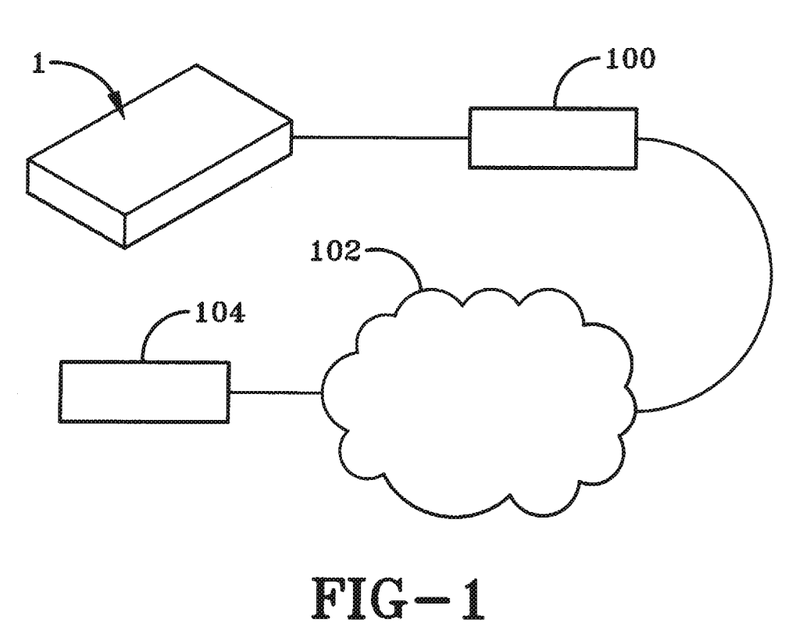
FIG. 1 illustrates an environment in which the preferred embodiment of a TeraStar memory system may operate.

FIG. 1 illustrates one example environment where the TeraStar memory system 1 can operate. The TeraStar memory system 1 is connected to a network interface unit 100 that is connected to a local network 102. The network interface unit 100 and the local network 102 can be any type of network interface or network us understood by one of ordinary skill in this art. The network interface unit 100 formats data exchanged between the TeraStar memory system 1 and the local network 102 so that it is a format expected by these two devices 1, 102. A computer 104 is connected to the local network 102. The computer 104 or any device that wants to write to memory or read from memory stored in the TeraStar memory system 1 can then access the memory stored in the TeraStar memory system 1 via the local network 102 and the network interface unit.

Figure 2:
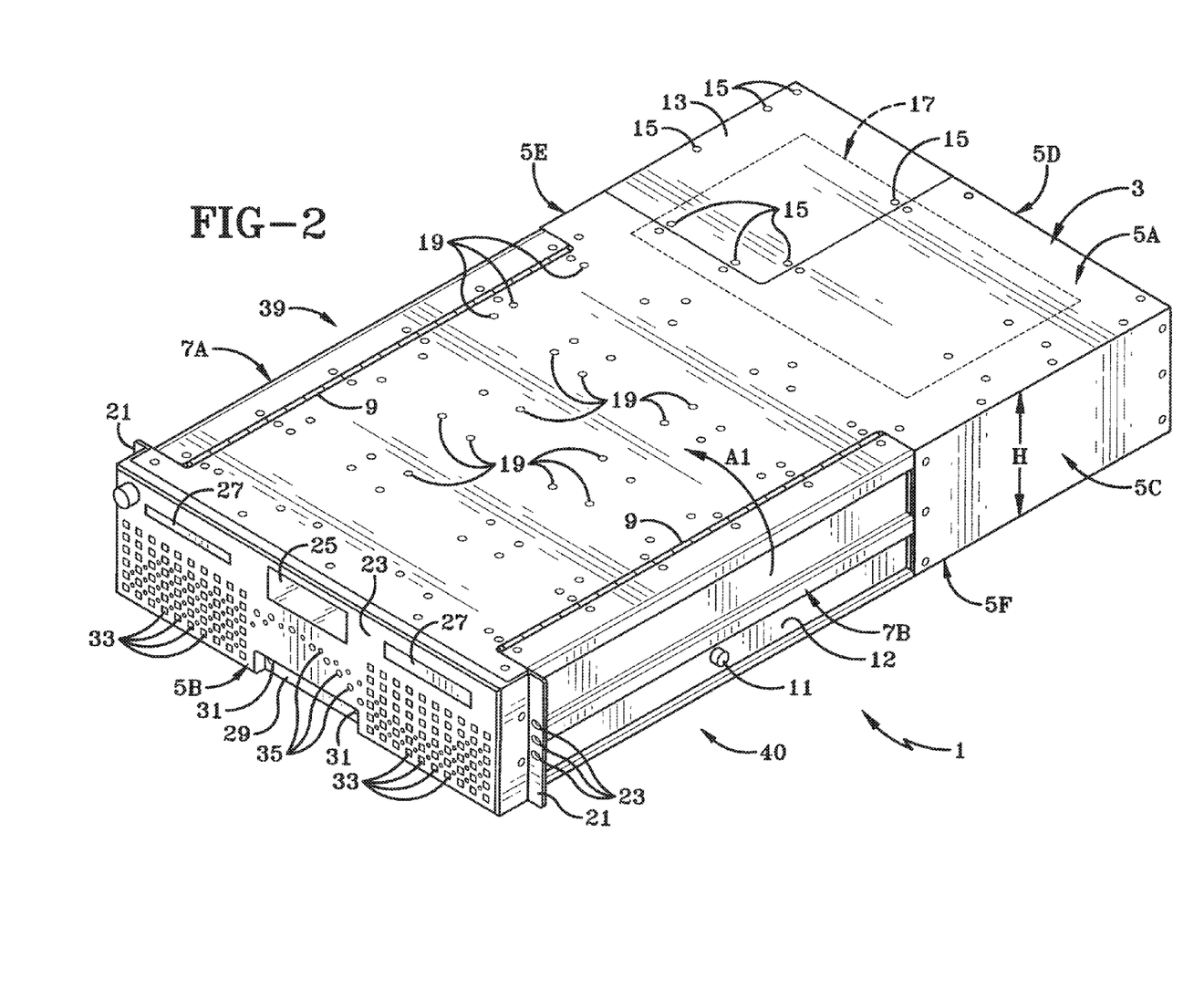
FIG. 2 illustrates a perspective view of the preferred embodiment of the TeraStar memory system.

Referring to FIG. 2, the TeraStar memory system 1 includes a chassis/housing 3. The housing 3 is generally rectangular in shape and includes a top side 5A, a front side 5B, a right side 5C, a back side 5D a left side 5E and a bottom side 5F. The housing 3 includes left and right doors 7A-B each connected to the housing 3 with elongated hinges 9 similar to piano type of hinges. As illustrated in FIG. 2 the hinges 9 allow the door 7A to open in an upward direction as shown by arrow A1. Door 7A opens in a similar way. Each door 7A-B has a thumb-screw 11 that allows the doors 7A-B to be locked in a closed position by the thumb-screw 11 or to be quickly released by removing the thumb-screw 11. The thumb-screws 11 are located in a recessed portion 12 of the doors 7A-B. Once the thumb-screws are unfastened, the doors 7A-B can easily be opened by placing fingers in the recessed area 12 and pulling the door upward.

The housing 3 further includes an access panel 13 that is releasably held in place by several screws 15. The access panel 13 provides access to a memory controller logic 17 located at the rear end of the housing near the back wall 5D. Additional screws 19 hold c-shells, fans and other component that are discussed further below to the chassis/housing 3. The front wall 5B further includes side tabs 21 on its left and right sides. Bolts can be passed through openings 23 on the side tabs to easily mount the TeraStar memory system 1 in an equipment rack.

Figure 3:
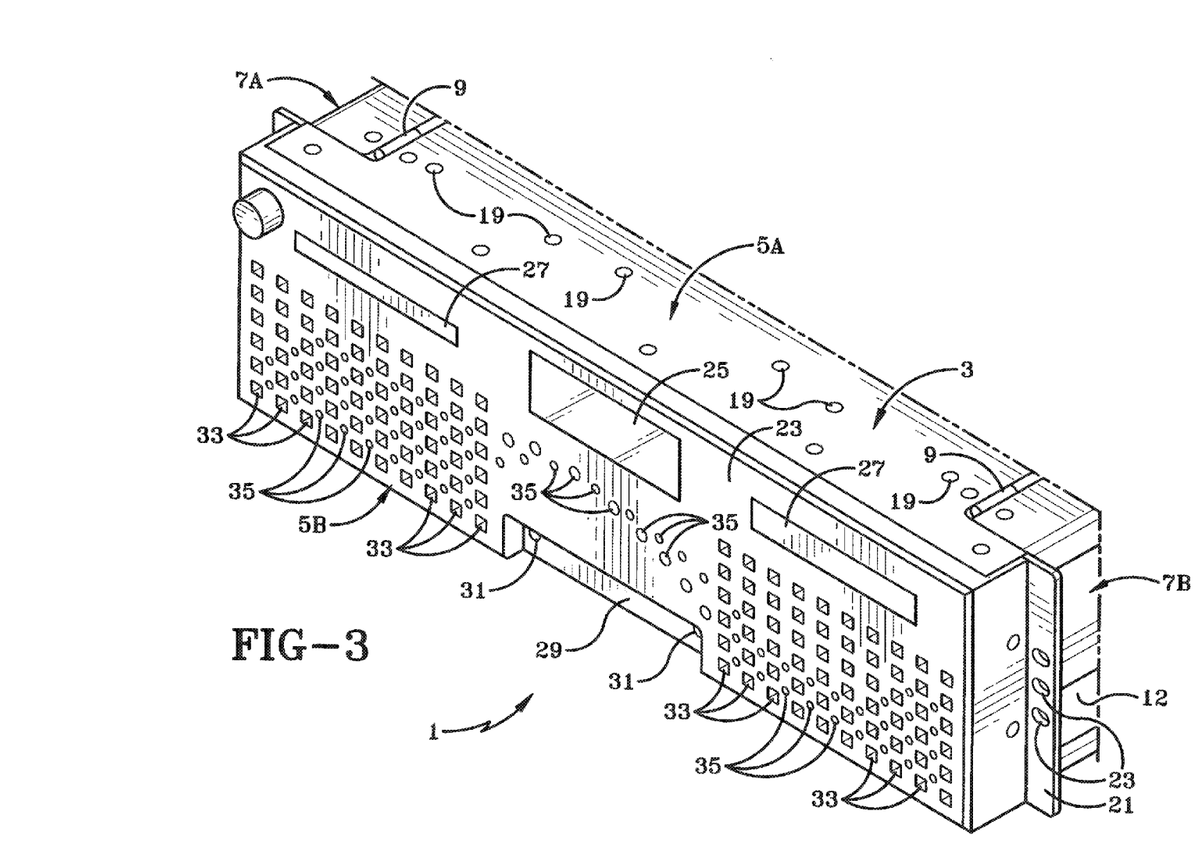
FIG. 3 illustrates a front view of the front panel of the preferred embodiment of the TeraStar memory system.

FIG. 3 illustrates the preferred embodiment of the TeraStar memory system 1 front panel 23 that forms the front wall 5B. The front panel 23 includes a display 25 that can be a liquid crystal display (LCD) or another type of display as understood by one of ordinary skill in this art. The front panel 23 includes one or more labels 27 that can be used to display information about the TeraStar memory system 1 or other information. The front panel 23 has a lower central recessed area 29. This recessed area 29 provides an ideal location for one to place their fingers when lifting the TeraStar memory system 1. Bolts 31 in the recessed area 29 aid in connecting the front panel 23 to the chassis/housing 3.

The front panel 23 contains distinctive openings. The openings include left and right arrays of square openings 33 arranged in rectangular patterns consisting of rows and columns of openings 33. Additionally, two different sizes of round openings 35 are spread from left to right across the front panel as illustrated.

Figure 4:
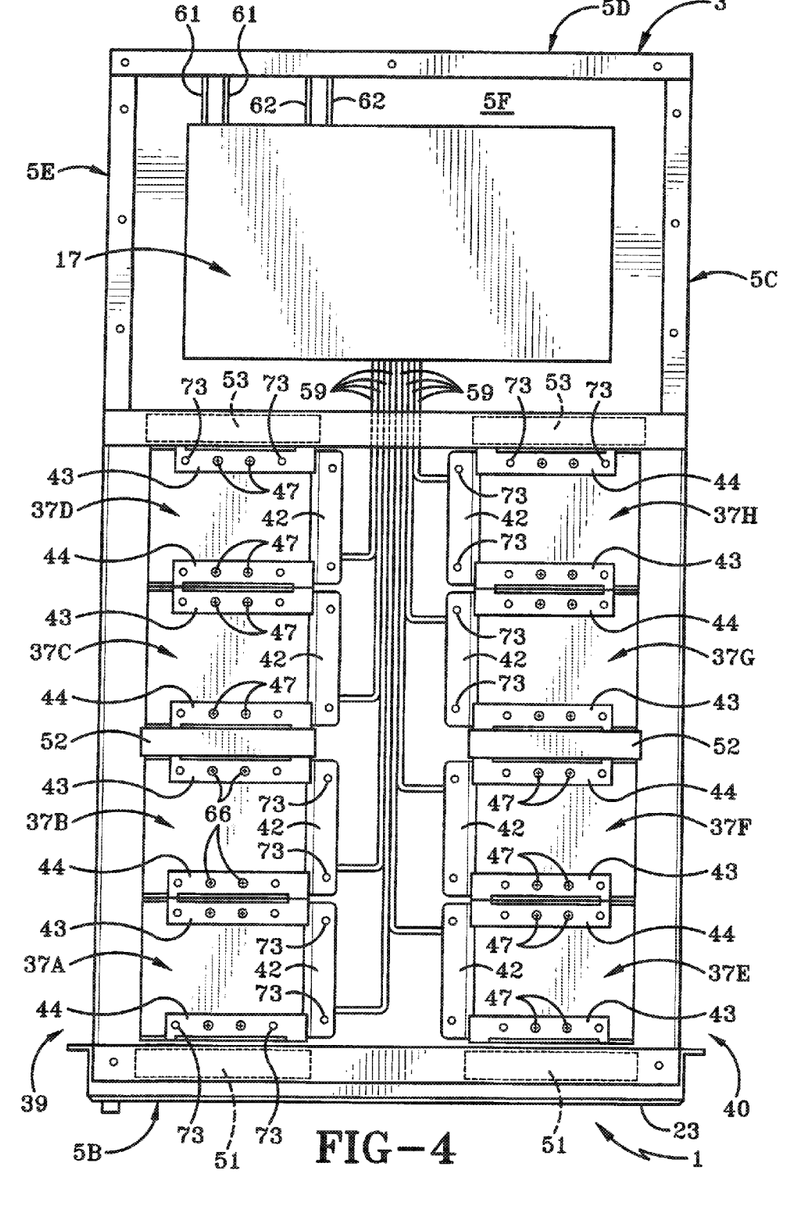
FIG. 4 illustrates a top view of the preferred embodiment of the TeraStar memory system with its top cover removed.

FIG. 4 illustrates a top view of the memory system 1 with its top wall 5A removed. The top portions of eight c-shell units 37A-H can be seen. As discussed below each c-shell unit can house four memory units such as disk drives, hard drives or another type of memory. Four c-shell units 37A-D are aligned adjacent each other on the left side 39 of the memory system 1 and four c-shell units 37E-H are similarly aligned adjacent each other on the right 40 side of the memory system 1. Rear flanges 42 of each c-shell unit 37A-H are attached to the top wall 5A with screws 73. Additionally, the corners of the upper left flanges 43 and upper right flanges 44 are attached to the top wall 5A with screws 73. As seen through openings 66 (FIG. 5) in upper left flanges 43 and upper right flanges 44 screws 47 are also used to secure a bottom shelf 49 of the c-shells 37A-H to bottom side 5F of the housing 3.

Fan cooling units 51 are located between the front panel 23 and c-shell 35A and c-shell 37E to provide active cooling of the c-shells 37A-H. Fan cooling units 52 are located between c-shell 35C and c-shell 37B and between c-shell 35G and c-shell 37F. Additional fan cooling units 53 are located between c-shell 37D and a control logic 17 as well as between c-shell 37H and the control logic 17.

"Processor" and "Logic", as used herein, include but are not limited to hardware, firmware, software and/or combinations of each to perform a function(s) or an action(s), and/or to cause a function or action from another logic, method, and/or system. For example, based on a desired application or need, logic and/or processor may include a software controlled microprocessor, discrete logic, an application specific integrated circuit (ASIC), a programmed logic device, a memory device containing instructions, or the like. Logic and/or processor may include one or more gates, combinations of gates, or other circuit components. Logic and/or a processor may also be fully embodied as software. Where multiple logics and/or processors are described, it may be possible to incorporate the multiple logics and/or processors into one physical logic (or processors). Similarly, where a single logic and/or processor is described, it may be possible to distribute that single logic and/or processor between multiple physical logics and/or processors.

The data of all four memory bays of each c-shell are collected on a single connector and transported to the control logic 17 on a single cable 59. In summary, there are eight cables 59, one to transport all four memory bay signals of each c-shell to the control logic 17. These cables 59 are routed in a central trough running between the two banks of c-shells. The preferred embodiment of the TeraStar system 1 includes a pair of 1-gigabit input/output I/O lines 61 connected between connectors on the back wall 5D and the control logic 15 as well as a pair of 10-gigabit input/output I/O lines 61 connected between connectors on the back wall 5D and the control logic 17.

Figure 5:
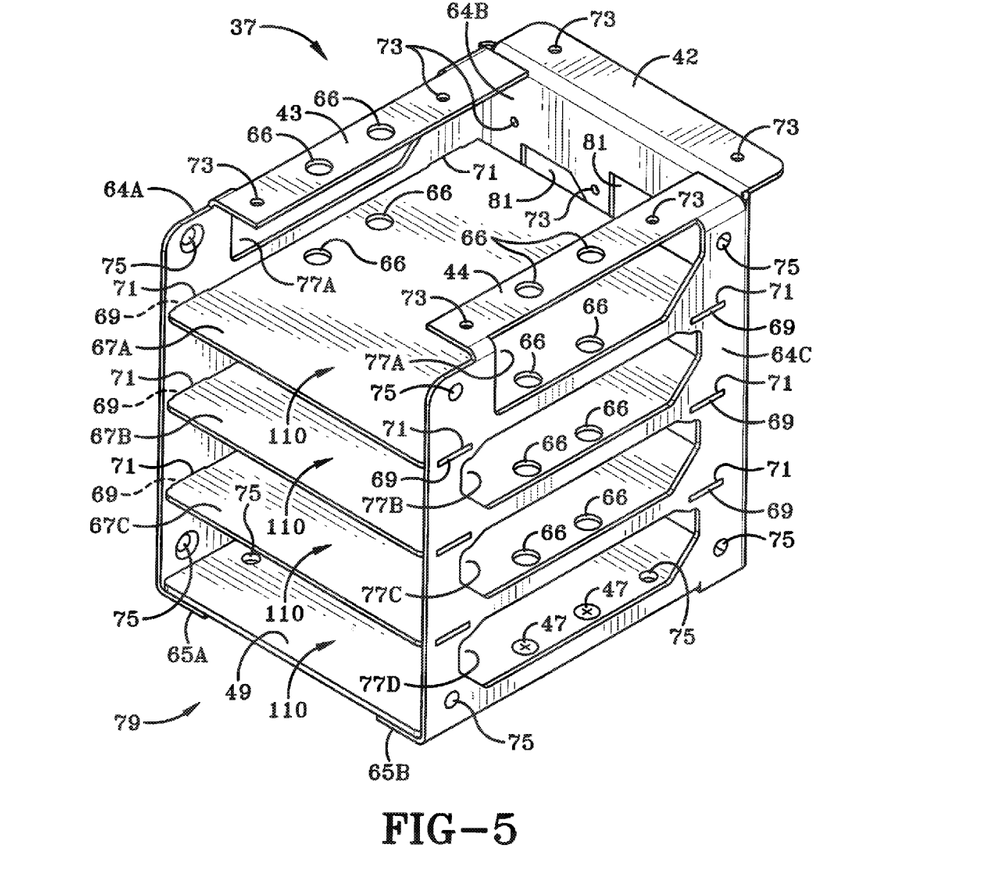
FIG. 5 illustrates a perspective view of a c-shell of the preferred embodiment of the TeraStar memory system.

FIG. 5 illustrates a single c-shell 37. Each c-shell 37 has a left wall 64A, a back wall 64B and a right wall 64C. These walls can be formed out of a single piece of high strength aluminum and then bent into the shape of FIG. 5. The upper left flange 43 extends inward from the left wall 64A and the upper right flange 44 extends inward from the right wall 64C. The rear flange 42 extends outward from the back wall 64B. The left wall 64A further includes a lower left flange 65A that extends inward and the right wall 64C includes a lower right flange 65B that also extends inward toward the lower left flange 65A. Holes 66 are located in the left flange 43 and the right flange 44 to allow a screwdriver to pass through to allow screws 47 to be tightened into through the lower left flange 65A and the lower right flange 65B and into the chassis 3.

In addition to the bottom shelf 49, the c-shell unit 37 has three other shelves 67A-C. Each of these shelves 67A-C has a tab 69 near each of its four corners. These tabs 69 are adapted to pass through complementary rectangular shaped openings 71 in the left wall 64A and the right wall 64C. Shelves 67A-C contain openings 66 similar to the right flange 42 and the left flange 43 to allow a screwdriver to pass through to allow screws 47 to be tightened into the chassis 3. Openings formed between the walls 64A-C and the shelves 67A-C are memory bays 110 into which a 2.5 inch, a 3.5 inch or another size of memory can be inserted as discussed in more detail later.

The c-shell 37 also contains a variety of other holes/openings. For example, thread holes 73 provide a way to attach a top wall of the housing 3 to the top of the c-shells 37 and/or to provide a way mount to a printed circuit board (PCB) vertically to the back wall 64B. Other holes 75 provide openings to used bolts to connect adjacent c-shells together and/or to further mount the c-shells 37 to the bottom of the housing 3. Of course some of these holes may not be used and can instead allow more cooling air to circulate through the c-shells while they are in operation.

One of the novel features of this c-shell 37 is that it is readily cooled by flowing air from its left side 64A to its right side 64C. Large openings 77A-D in the left side 64A and the right side 64C provide open areas to allow air blow by fans to flow through. As illustrated, in the preferred embodiment, these openings 77A-D generally extends from the front end 79 of the c-shell to the back wall 64B. Openings in the back wall 64 allow connectors on a PCB (discussed below) or other components on the PCB to extend partially into the c-shell 37.

Figure 6:
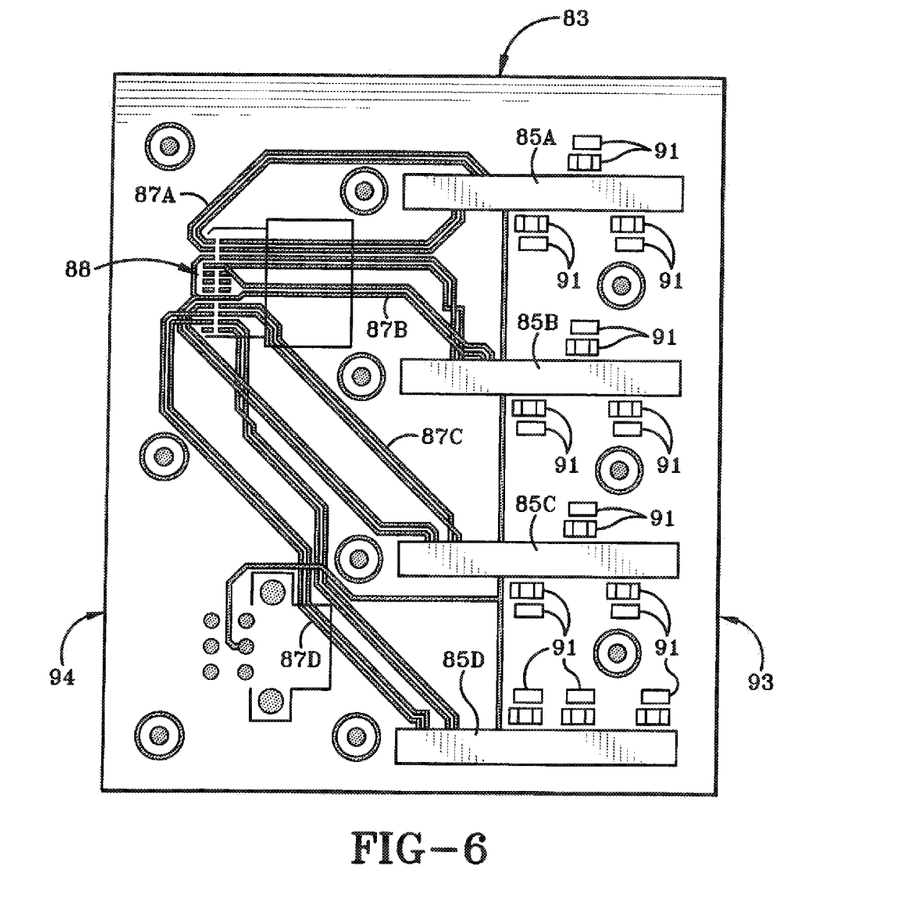
FIG. 6 illustrates an example view of a printed circuit board (PCB) used with a c-shell of the preferred embodiment of the TeraStar memory system.

FIG. 6 illustrates the preferred embodiment of a PCB 83 that is mounted to the back wall of a c-shell 37. As discussed in more detail below, these memory backplanes (PCB 83) provide four serial attached SCSI (SAS) disk connections in a stacked vertical configuration unlike prior art disk drive backplanes are typically designed for Serial ATA (SATA) or SAS disks in a horizontal configuration. By utilizing a vertical orientation in the memory backplanes, the TeraStar memory system 1 reduces the overall PCB 83 trace length between the disk interface cable and the SAS disk drive ports. This results in a more efficient design which allows the use of primarily passive components on the PCB 83 which in turn reduces the power requirements for the overall TeraStar memory system 1.

This PCB 83 is novel in that it does not need to alter data signals transmitted to and received from each of the four memory bays before reaching the controller logic 17. The power signal(s) are isolated on a right side of the PCB and may be conditioned with one or more capacitors 91 of various values. Additionally, there may be pull-up circuits to be sure that power is supplied at a specific value. Connectors for each media bay are mounted to the memory bay connector pads 85A-D located toward the right side of the PCB 83. Traces 87A-D carrying generally non-power data signals leave these pads and run generally directly to c-shell consolidation connector pads 89 located near the upper left corner of the PCB 83. For example, Traces 87D-C are routed from a lower right/central location diagonally toward the upper left location of the c-shell consolidation connector pads 89. Traces 87A-B that are located generally to the right of the c-shell consolidation connector pads 89 travel generally horizontally toward the c-shell consolidation connector pads 89. This routing reduces interference with power signals on the right side of the PCB 83 and reduces the length of travel of unaltered data signals between a memory bay and the controller logic 15. A c-shell consolidation connector is mounted on the c-shell consolidation connector pads 89 pads and bundles all four sets of data signals from each of the four media bays installed in the TeraStar memory system 1 at this connector. In the preferred embodiment, this consolidation connector is an SFF-8087 connector but it can be another type of connector. These four sets of raw/unconditioned and unamplified data signals can then travel through a single cable from the c-shell connector at the c-shell connector Pads to the controller logic 17.

Figure 7:
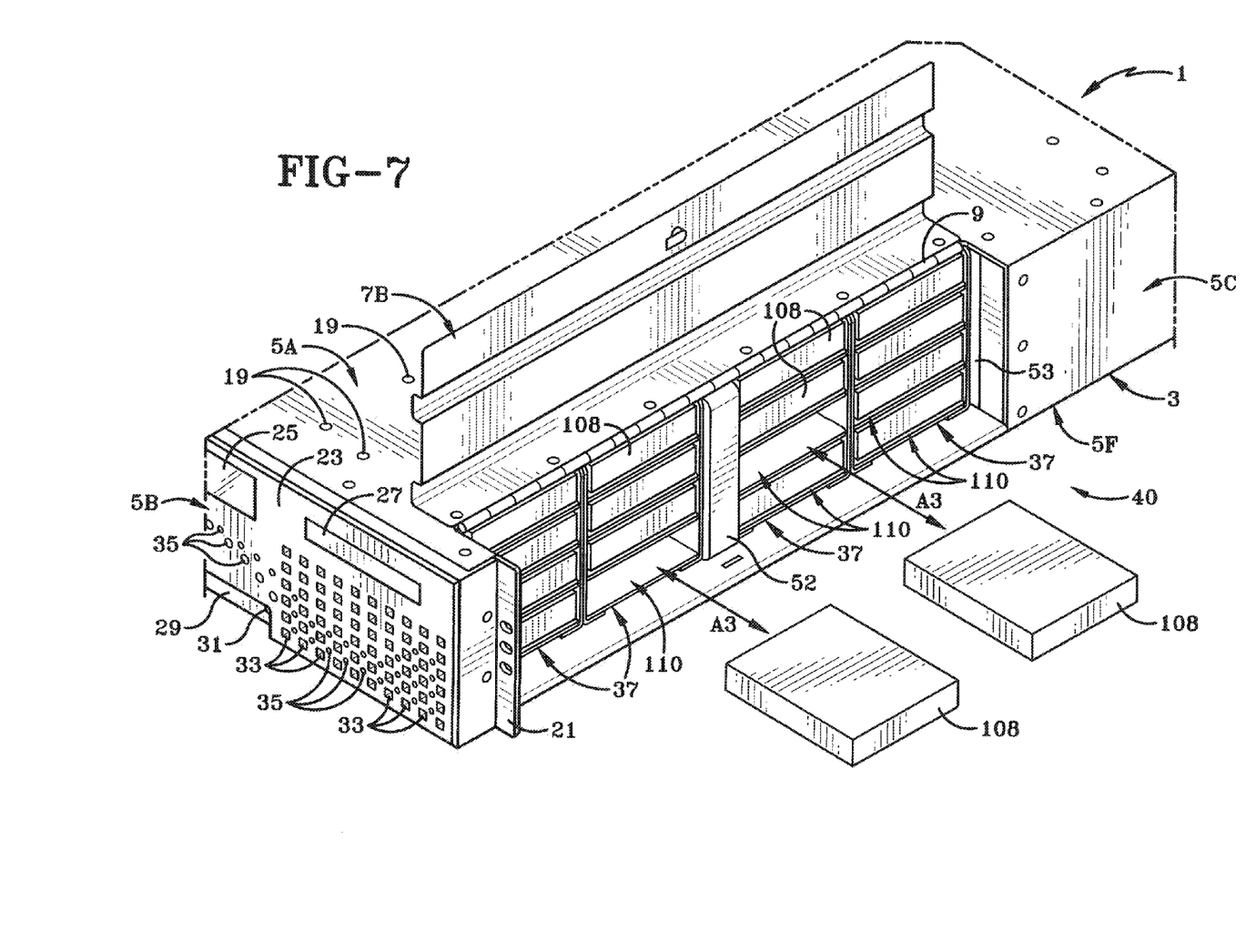
FIG. 7 illustrates a perspective view showing how memory devices are loaded into and taken out of the rights side of the preferred embodiment of the TeraStar memory system.

FIG. 7 illustrates the TeraStar memory system 1 with its right door 7B opened in the upward position. This example illustrates how memory devices 108 can be loaded into and removed from the four adjacent c-shells, for example in the direction of arrows A3. Here, 14 of the 16 memory bay contain a 3.5 inch memory device 108 that nearly fills each memory bay 110. However, other sizes of memory can be used in the memory bay 110. For example, SATA (I, II, III), SAS (3, 6) and Solid State Disk (SSD) versions in either a 3.5 inch and/or a 2.5 inch form factor or other types of memory devices can be used in any of the memory bays 110.

It will be appreciated that the orientation of the memory devices 108 within the c-shells 37A-H of the TeraStar memory system 1 is a unique design allowing for the use of 32 hot swappable memory devices when inserted into the main TeraStar chassis 3 at a total quantity of eight c-shell units 37A-H (e.g., disk cages) per system. Through the use of non-magnetically conductive metal in the construction of these c-shell units 37A-H, the memory devices can be placed in close proximity to one another eliminating magnetic interference from other memory devices in the c-shell units 37A-H and the system 1 when placed in this orientation.

Furthermore and as mentioned below, the c-shell units 37A-H allow for positive airflow from one side of the c-shell units 37A-H to another over the top of the inserted memory devices thus allowing for the memory device to be adequately cooled at room temperature when in operation. The use of high strength aluminum in the construction of the c-shell units 37A-H allows for the c-shell units 37A-H to act as a passive heat sink for the installed disks as well as providing structural reinforcement for the system in its assembled configuration.

Figure 8:
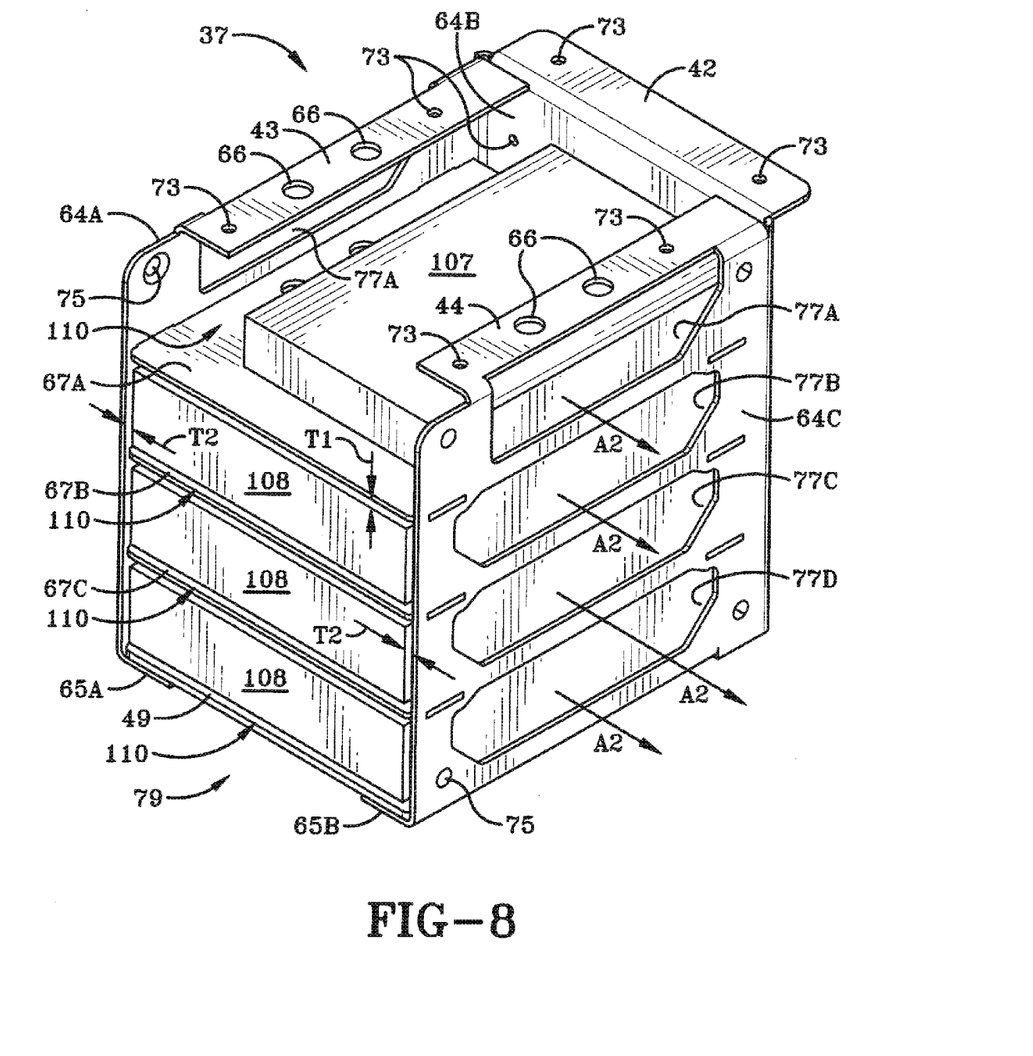
FIG. 8 illustrates a perspective view of memory devices loaded into a c-shell of the preferred embodiment of the TeraStar memory system.

FIG. 8 illustrates a detailed view of memory loaded into a c-shell 37. In this example, one 2.5 inch form factor memory device 107 is load in the upper most memory bay 110 with three 3.5 inch form factor memory devices 108 loaded into the three other memory bays 110. The TeraStar memory system 1 does not require traditional "sleds" that are needed by prior art systems to ensure proper insertion into the chassis disk drive bay and typically are attached to the disk drives via 4-6 screws installed through the disk sled into the disk drive itself. The use of these disk "sleds" consumes an excessive amount of man hours to install and remove these screws on a regular basis in many disk drives at once decreasing the use of the hot swap disk technology. Unlike COTS storage servers that use disk "sleds" which attach to the disk drive prior to insertion into a memory bay, the c-shells 37 of the TeraStar memory system 1 do not require memory devices to be attached to sleds. The TeraStar memory system 1 eliminates the need for this "sled" by using specific mechanical design specifications in the c-shells 37 conforming to COTS storage media measurements and the use of one overall side door panel on each side of the unit. This provides a cleaner, quicker and more flexible disk drive insertion and removal process.

The elimination of the use of sleds also provides more free space to allow the TeraStar memory system 1 to be air cooled at a room temperature of about 70 degrees Fahrenheit (F) only using fans. Because sleds are not used, there is a gap of T1 (FIG. 8) between the top of a 3.5 inch form factor memory 108 and the floor above that memory. This small gap of about ⅛ of an inch allows air to flow in the direction of arrows A2 from the left side 64A of the c-shell 37 of FIG. 8 to the right side 64C of the c-shell. The openings 77A-D also greatly aid in this airflow and cooling of memory devices 107, 108 in the c-shell. A gap of T2 between memory devices 108 and the left wall 64A (and similarly with the right wall 64C) also aids in cooling the memory devices 108. In an alternative configuration, there may be a gap between the bottom of a memory device and the bottom shelves or aid in further cooling and this gap may be created with small pads located on the bottom of some of the memory devices.

Note that either a 2.5 inch form factor memory device 207 or a 3.5 inch form factor memory device 108 can be hot-plugged into one of the same connector 85A-D located on the PCB 83 that is vertically attached to the back wall 64B of the c-shell 37 while the TeraStar memory system is in operation. These connectors 85A-D are located near the lower right portion of each memory bay 110 so that different types of memories will fit into the memory bays 110 and be physically supported by a corresponding memory bay 110 shelf 64A-D. For example and as mentioned above, SATA (I, II, III), SAS (3, 6), SSD versions in either a 3.5 inch and/or a 2.5 inch form factor or other types of memory devices can be used with the same connector. In the preferred embodiment, the connector is an SFF-8482 connector that is supports SATA as well as SAS and other types of memory devices. Having described the components of the TeraStar memory system 1, its use and operation will now be described. To prepare the system 1 for operation its side doors 7A-B are rotated upward in the direction of arrow A1 (FIG. 1) and any combination of memory devices 107 with a 2.5 inch form factor and/or memory devices 108 with a 2.5 inch form factor are loaded into the 32 memory bays 110. After that the TeraStar memory system 1 is started and begins to operate at room temperature of about 70 degrees Fahrenheit. It is air cooled by its internal fans without having any additional cooling requirements. This allows the system 1 to solely be air cooled but not reaching an operating temperature of about 85 degree Fahrenheit. Once up and running the TeraStar memory system 1 can be accessed by any computing device on the local network 102 of FIG. 1. For example, commands from the computer 104 can store data in the TeraStar memory system 1 and request data from the TeraStar memory system 1.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 9:
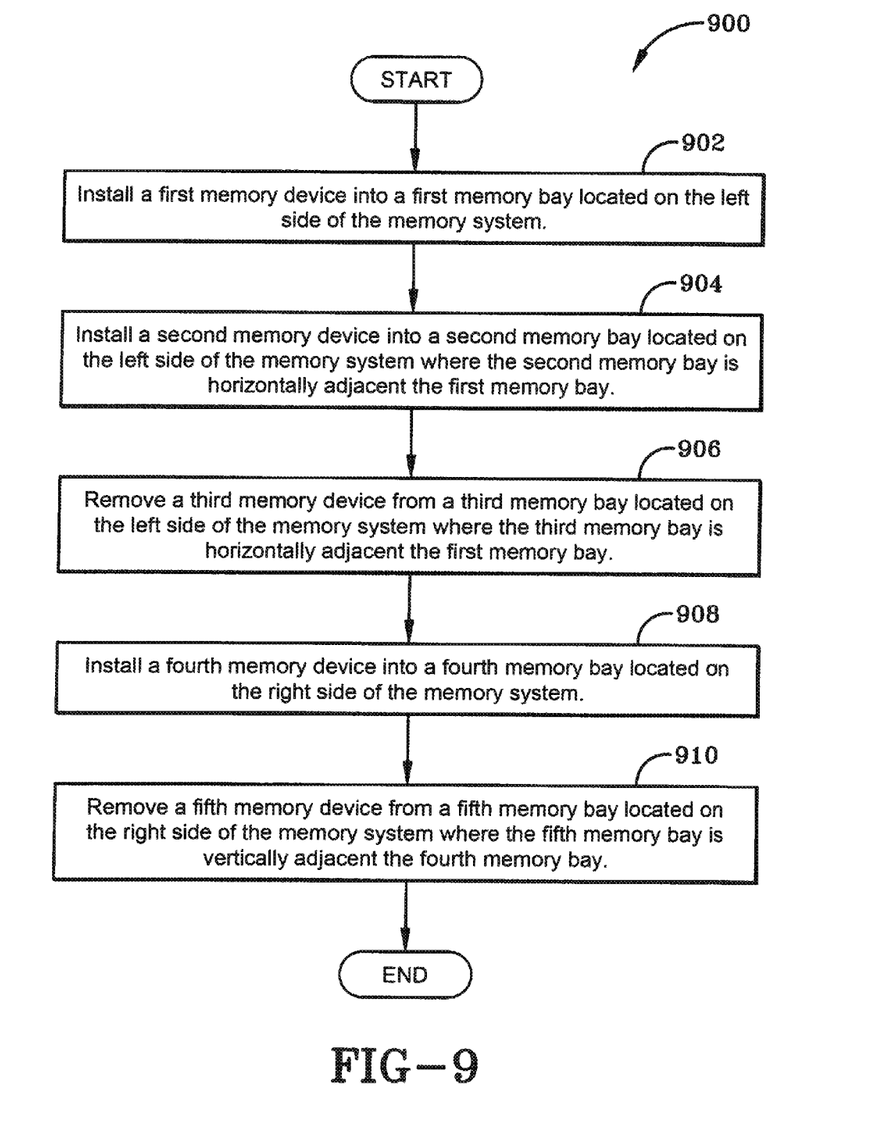
FIG. 9 illustrates an embodiment of a method for loading and removing memory from the preferred embodiment of the TeraStar memory system.

FIG. 9 illustrates a method 900 of adding and removing memory from a memory system. The memory system is rack mountable with a front side a back side, a left side, a right side, a top side and a bottom side with the memory system rack mountable between is left and right sides. The method 900 begins by installing a first memory device into a first memory bay located on the left side of the memory system, at 902. The memory device and memory bay are similar to the memory devices and memory bays discussed above. A second memory device is installed into a second memory bay, at 904, that is located on the left side of the memory system and where the second memory bay is horizontally adjacent the first memory bay. A third memory device is then removed from a third memory bay located on the left side of the memory system, at 906. The third memory bay is horizontally adjacent the first memory. A fourth memory device is installed into a fourth memory bay located on the right side of the memory system, at 908. A fifth memory device is removed from a fifth memory bay located on the right side of the memory system, at 910, where the fifth memory bay is vertically adjacent the fourth memory bay.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A memory system comprising:
 a housing with a front side, a left side, a back side and a right side,
 two or more c-shell units positioned horizontal and adjacent each other on a right side of the memory system, wherein each c-shell unit is comprised of at least two sled-less memory bays and the at least two sled-less memory bays are positioned vertically relative to each other, and wherein each of the at least two sled-less memory bays is adapted to receive a memory device;
 two or more c-shell units positioned horizontal and adjacent each other on a left side of the memory system, wherein each c-shell unit is comprised of at least two sled-less memory bays and the at least two sled-less memory bays are positioned vertically relative to each other, and wherein each of the at least two sled-less memory bays is adapted to receive a memory device;
 a single printed circuit board (PCB) for each c-shell unit, wherein the PCBs are vertically mounted to a corresponding c-shell unit; and
 a control logic configured to control access to and from the memory devices for storing data to the memory devices and retrieving data from the memory devices, wherein each PCB comprises traces to route signals between the control logic and the memory devices.

2. The memory system of claim 1 further comprising:
 two or more fans in-line with the two or more c-shell units to simultaneously cool the two or more c-shell units.

3. The memory system of claim 2 wherein the two or more fans cool the memory system to an operating temperature of about 70 degrees Fahrenheit.

4. The memory system of claim 2 wherein the two or more c-shell units further comprise:
 a left side;
 a right side;
 a back side;
 a front side wherein the memory devices are loaded into the front sides of the c-shells and removed from the front sides of the c-shell; and
 wherein the fans blow air from the left side of a c-shell unit to a right side of a c-shell unit.

5. The memory system of claim 1 further comprising:
 a front faceplate and a rear wall, wherein the front faceplate comprises openings to allow air to enter the housing;
 a first fan located between the front faceplate and one of c-shell units;
 a second fan located between two adjacent c-shell units; and
 a third fan located between a c-shell unit and the rear wall.

6. The memory system of claim 1 wherein the maximum height of the memory system is three rack units (3-RU).

7. The memory system of claim 1 wherein each PCB further comprises:
 memory bay connectors, wherein each of the memory bay connectors are each configured to connect to a single corresponding memory device;
 a single consolidation connector wherein the traces route signals between the memory bay connectors and the single consolidation connector; and
 a single cable connected between each single consolidation connector of each PCB and the control logic.

8. The memory system of claim 7 wherein data signals traveling between the memory devices and the control logic are unamplified and unprocessed signals.

9. The memory system of claim 7 wherein the memory bay connectors are Serial Attached SCSI (SAS) interfaces and the single consolidation connector is a single SFF-8087 interface on an opposite side of the PCB than the SAS interfaces.

10. The memory system of claim 7 further comprising:
 a single cable connected between the single consolidation connector and the control logic for communicating all of the signals of the memory devices of a corresponding c-shell with the control logic.

11. The memory system of claim 1
 wherein the two or more c-shells further comprise:
 four c-shells located on the left side of the housing, wherein memory devices can be inserted and removed from the four c-shells located on the left side; and
 four c-shells located on the right side of the housing, wherein memory devices can be inserted and removed from the four c-shells located on the right side.

12. The memory system of claim 1 further comprising:
 at least one fan, wherein the at least one fan cools the memory system to an operating temperature below 85 degrees Fahrenheit without any other cooling than the at least one fan is needed, and wherein the maximum height of the memory system is standard 3-RUs and the memory system fits in a standard 21 inch wide rack.

13. The memory system of claim 12 wherein the two or more c-shell units are formed out of high strength aluminum, wherein the memory system weighs less than 35 pounds, and wherein the memory system contains at least 128 terabytes of memory.

14. A memory system comprising:
 a housing with a front side, a back side, a left side, a right side, a bottom side and a top side;
 two or more horizontal memory bays that are horizontal and adjacent each other on the left side of the memory system, wherein memory devices can be inserted into the two or more horizontal memory bays on the left side, and wherein the memory devices can be removed from the two or more horizontal memory bays on the left side;
 two or more horizontal memory bays that are horizontal and adjacent each other on the right side of the memory system, wherein memory devices can be inserted into the two or more horizontal memory bays on the right side, and wherein the memory devices can be removed from the two or more horizontal memory bays on the right side;
 two or more vertical memory bays that are vertical and adjacent the horizontal memory bays on the left side of the memory system, wherein the vertical memory bays are horizontal and adjacent to each other on the left side of the memory system, wherein memory devices can be inserted into the two or more vertical memory bays on the left side, and wherein the memory devices can be removed from the two or more vertical memory bays on the left side; and
 two or more vertical memory bays that are vertical and adjacent the horizontal memory bays on the right side of the memory system, wherein the vertical memory bays are horizontal and adjacent to each other on the right side of the memory system, wherein memory devices can be inserted into the two or more vertical memory bays on the left side, and wherein the memory devices can be removed from the two or more vertical memory bays on the right side of the memory system.

15. The memory system of claim 14 further comprising:
a single left hinged door on each on the left side of the housing that can be opened and closed to provide access and protection to memory devices installed in memory bays on in the left side of the memory system; and
a single right hinged door on each on the right side of the housing that can be opened and closed to provide access and protection to memory devices installed in memory bays on in the right side of the memory system.

16. The memory system of claim 14 wherein the left hinged door and the right hinged door are both adapted to be rotated to an upward open position and rotated downward to a closed position.

17. The memory system of claim 14 further comprising:
at least one fan, wherein the at least one fan cools the memory system to an operating temperature below 85 degrees Fahrenheit without any other cooling needed than the at least one fan is, and wherein the maximum height of the memory system is standard 3-RUs and the memory system fits in a standard 21 inch wide rack.

18. The memory system of claim 17 wherein the front side further comprises:
openings through which the at least one fan is adapted to pull cooling air through so that cooling air enters the memory system from the openings in the front side passes through the memory bays and exits the back side of the memory system.

* * * * *